Patented Apr. 7, 1925.

1,532,627

UNITED STATES PATENT OFFICE.

KARL HEUSNER AND MAX SIMON, OF LEVERKUSEN, NEAR COLOGNE-ON-THE-RHINE, GERMANY, ASSIGNORS TO FARBENFABRIKEN VORM. FRIEDR. BAYER & CO., OF LEVERKUSEN, NEAR COLOGNE-ON-THE-RHINE, GERMANY.

PROCESS FOR THE PREPARATION OF AMINOAZO COMPOUNDS.

No Drawing. Application filed July 24, 1924. Serial No. 727,984.

*To all whom it may concern:*

Be it known that we, KARL HEUSNER and MAX SIMON, citizens of Germany, residing at Leverkusen, near Cologne-on-the-Rhine, in the State of Prussia, Germany, have invented new and useful Improvements in Processes for the Preparation of Aminoazo Compounds, of which the following is a specification.

It has been found that the alpha-naphthylsulfaminic acid described by Piria (Ann. 78 (1851) p. 31 onwards) as a thionaphthamic acid (in spite of the presence of a markedly acidic sulfuric acid residue in the aminoacidic sulfuric acid residue in the aminogroup) may be combined with diazo-compounds and that the entry of the diazo-group occurs almost quantitatively in the paraposition to the sulfamino-group. On the other hand it is well known that when using alpha-naphthylamine that on the average from 5 to 20 per cent of the valueless ortho-compound are produced with the para-compound, according to the choice of the diazotization components and the condition of coupling.

As the splitting off of the sulfo-group takes place easily on warming in aqueous mineral acid solution, dyestuffs may be obtained by the aid of alpha-naphthylsulfaminic acid, which compared with those obtained from alpha-naphthylamine give considerably higher yields and are moreover of a higher purity than these.

Our invention consists therefore in combining any diazo compound with alpha-naphthyl-sulfaminic acid. This reaction is represented by the formula:

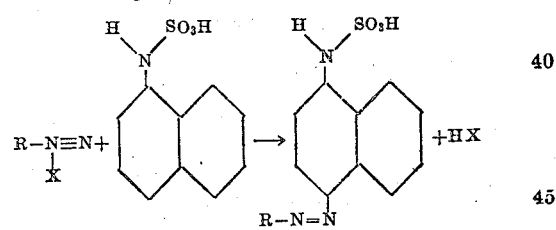

In order to illustrate the new process more fully the following examples are given:—

*Example 1.*—10.7 parts by weight of paratoluidine are diazotized in the customary manner and coupled at ice temperature with a solution of 24.5 parts by weight of sodium alpha-naphthylsulfaminate and 28 parts by weight of soda ash. After stirring for several hours the coupling is terminated. The dye so obtained is a yellow precipitate. It may be filtered off and dried without decomposition. It is soluble in hot water to a clear yellow solution. The splitting off of the sulfo-group takes place on acidification of the coupled product with 100 parts by weight of 19° Bé. hydrochloric acid whilst warming. The higher the mixture is heated, the sooner the splitting off of the sulfo-group is completed. The elimination of the sulfo-group occurs without any loss in yield.

The reactions involved can be formulated as follows:

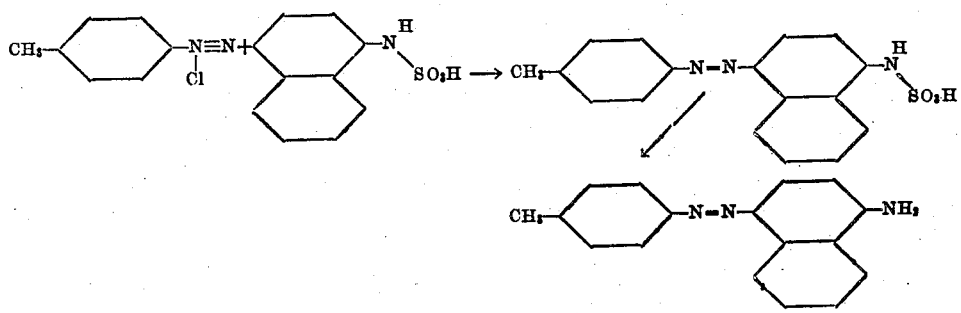

In place of para-toluidine other diazotization components may be taken as for instance aniline, chloroanilines, aminophenolethers, monoacidylphenylenediamines, nitranilines and their homologues, alpha- and beta-naphthylamines, aminonaphtholethers, aminoanthraquinones, diaminodiphenyl-derivatives etc.

*Example 2.*—17.3 parts by weight of meta-sulfanilic acid are diazotized in the usual manner and then coupled with a solution of 24.5 parts by weight of sodium-alpha-naphthylsulfaminate and 20 parts by weight of 100 per cent sodium acetate at about 10° C. The coupling is completed after several hours stirring and a clear brown-yellow solution results. For the purpose of splitting off the sulfo group the product of the coupling is rendered acid with 100 parts by weight of hydrochloric acid (19° Bé.) and is warmed for some time.

The reactions involved can be formulated as follows:

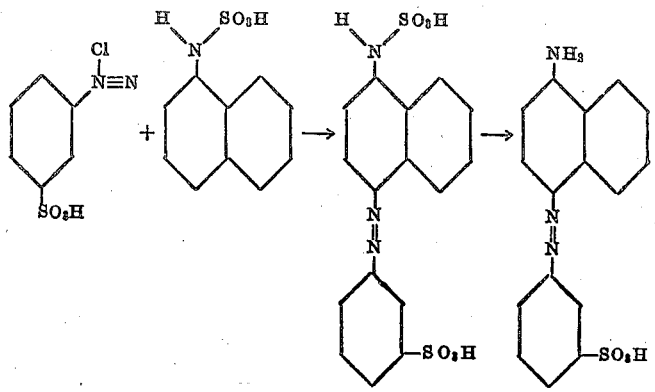

Instead of meta-sulfanilic acid other sulfonated carboxylated and substituted derivatives of the benzol, naphthalene, anthracene, anthraquinone and diphenyl series etc. may be used, e. g., aminosalicylic acid, aminodiarylamine sulfonic acids, monacoidylized phenylenediamine sulfonic acids, naphthylamine-mono, di, tri, and polysulfonic acids, aminoacidylnaphthylenediamine sulfonic acids. The coupling may be carried out in acid, neutral or alkaline solution.

We claim:-

A process for the preparation of sulfaminoazo bodies consisting in coupling diazo-compounds of any kind with alpha-naphthylsulfaminic acid.

In testimony whereof we have hereunto set our hands.

KARL HEUSNER.
MAX SIMON.